US011327763B2

(12) United States Patent
Perais et al.

(10) Patent No.: US 11,327,763 B2
(45) Date of Patent: May 10, 2022

(54) OPPORTUNISTIC CONSUMER INSTRUCTION STEERING BASED ON PRODUCER INSTRUCTION VALUE PREDICTION IN A MULTI-CLUSTER PROCESSOR

(71) Applicant: Microsoft Technology Licensing, LLC, Redmond, WA (US)

(72) Inventors: Arthur Perais, Morrisville, NC (US); Shivam Priyadarshi, Morrisville, NC (US); Yusuf Cagatay Tekmen, Raleigh, NC (US); Rami Mohammad Al Sheikh, Morrisville, NC (US); Vignyan Reddy Kothinti Naresh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/898,938

(22) Filed: Jun. 11, 2020

(65) Prior Publication Data

US 2021/0389951 A1 Dec. 16, 2021

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/30181* (2013.01);
(Continued)

(58) Field of Classification Search
None
See application file for complete search history.

(56) References Cited

U.S. PATENT DOCUMENTS 5,699,537 A * 12/1997 Sharangpani ......... G06F 9/3822
712/217
5,864,341 A * 1/1999 Hicks .................... G06F 9/3885
712/214
(Continued)

FOREIGN PATENT DOCUMENTS

GB 2322718 A * 9/1998 ........... G06F 9/3885
JP 2006072625 A * 3/2006 ........... G06F 9/3838

OTHER PUBLICATIONS

'Reducing Wire Delay Penalty through Value Prediction' by Joan-Manuel Parcerisa et al., Proceedings of the 33rd. Int. Symposium on Microarchitecture, pp. 317-326, Monterey (CA), Dec. 10-13, 2000. (Year: 2000).*
(Continued)

*Primary Examiner* — Steven G Snyder
(74) *Attorney, Agent, or Firm* — Withrow & Terranova, PLLC

(57) ABSTRACT

Opportunistic consumer instruction steering based on producer instruction value prediction in a multi-cluster processor is disclosed. A processor provides producer instructions and consumer instructions to a steering circuit that steers the program instructions to clusters of instruction execution circuits. An input value provided to a consumer instruction may be a produced value of a producer instruction, creating a dependency. The steering circuit steers a producer instruction to a first cluster and, in response to receiving the consumer instruction and the predicted value of the producer instruction, provides the predicted value to at least a second cluster and steers the consumer instruction to the second cluster for execution with the predicted value as the input value. A consumer instruction can be executed in a different cluster than a producer instruction without a cluster-to-cluster latency penalty, which allows the instruction loads to
(Continued)

be better balanced among the clusters for higher processor throughput.

22 Claims, 8 Drawing Sheets

(52) U.S. Cl.
CPC .......... *G06F 9/3828* (2013.01); *G06F 9/3832* (2013.01); *G06F 9/3836* (2013.01)

(56) References Cited

U.S. PATENT DOCUMENTS

| | | | |
|---|---|---|---|
| 5,996,060 A | 11/1999 | Mendelson et al. | |
| 6,219,780 B1* | 4/2001 | Lipasti | G06F 9/3824 712/206 |
| 6,757,807 B1* | 6/2004 | Jacobson | G06F 9/3012 712/23 |
| 7,373,485 B2* | 5/2008 | Ando | G06F 9/3012 712/218 |
| 7,490,220 B2* | 2/2009 | Balasubramonian | G06F 9/3891 712/32 |
| 8,103,856 B2* | 1/2012 | Balasubramonian | G06F 9/3828 712/30 |
| 10,037,211 B2* | 7/2018 | Fernsler | G06F 12/0875 |
| 10,915,327 B2* | 2/2021 | Nassi | G06F 9/3836 |
| 2006/0095736 A1* | 5/2006 | Ando | G06F 9/3885 712/218 |
| 2006/0106923 A1* | 5/2006 | Balasubramonian | G06F 9/3836 709/223 |
| 2007/0157006 A1 | 7/2007 | Jourdan et al. | |
| 2009/0216997 A1* | 8/2009 | Balasubramonian | G06F 9/5061 712/30 |
| 2016/0139933 A1 | 5/2016 | Srikantaiah | |
| 2019/0095203 A1* | 3/2019 | Pediaditaki | G06F 9/3832 |
| 2020/0192674 A1* | 6/2020 | Nassi | G06F 9/30145 |

OTHER PUBLICATIONS

'WiDGET: Wisconsin Decoupled Grid Execution Tiles' by Yasuko Watanabe et al., ISCA'10, Jun. 19-23, 2010, Saint-Malo, France, Copyright 2010 ACM. (Year: 2010).*
'PEWs: A Decentralized Dynamic Scheduler for ILP Processing' by Gregory A. Kemp et al., 1996 International Conference on Parallel Processing. (Year: 1996).*
'Modeling Value Speculation: An Optimal Edge Selection Problem' by Chao-ying Fu et al., IEEE Transactions on Computers, vol. 52, No. 3, Mar. 2003. (Year: 2003).*
'Value Speculation Mechanisms for EPIC Architectures' by Chao-ying Fu et al., Technical Report, Dept. of Electrical and Computer Eng., North Carolina State Univ., Oct. 1998. (Year: 1998).*
'Selective Value Prediction' by Brad Calder et al., copyright 1999, IEEE. (Year: 1999).*
"International Search Report and Written Opinion Issued in PCT Application No. PCT/US21/026077", dated Jul. 15, 2021, 10 Pages. (MS# 408321-WO-PCT).

* cited by examiner

| ARCHITECTED REGISTER | RENAME ALIAS TABLE 600 | | | |
|---|---|---|---|---|
| | CLUSTER 302A | CLUSTER 302B | CLUSTER 302C | CLUSTER 302D |
| ARCH REG 0 | PHYS REG 12 | PHYS REG 22 | PHYS REG 38 | ... |
| ARCH REG 1 | PHYS REG 1 | ... | ... | ... |
| ARCH REG 2 | ... | ... | PHYS REG 42 | ... |
| ... | ... | ... | ... | ... |
| ARCH REG P | PHYS REG 0 | ... | ... | PHYS REG 49 |

FIG. 6

OPPORTUNISTIC CONSUMER INSTRUCTION STEERING BASED ON PRODUCER INSTRUCTION VALUE PREDICTION IN A MULTI-CLUSTER PROCESSOR

FIELD OF THE DISCLOSURE

The technology of the disclosure relates to computer processors ("processors"), and more particularly to steering instructions to clusters of instruction execution pipelines in a multi-cluster processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "program instructions," to perform operations. An instruction that generates a produced value is a "producer" instruction. The produced value may then be stored in memory, provided as an output to an input/output ("I/O") device, or made available (i.e., communicated) as an input value to a "consumer" instruction executed by the CPU, as examples. Thus, execution of a consumer instruction may be dependent on having a produced value produced by a producer instruction available as an input value. In a processor that executes instructions sequentially, in order, the producer instruction is executed before the consumer instruction and the produced value is available as an input value to the consumer instruction. Some processors include multiple instruction execution paths, or functional units (FUs), allowing multiple instructions to be executed in parallel or out-of-order. However, a consumer instruction for which the produced value from a producer instruction is an input value cannot be executed in parallel with or before the producer instruction due to the dependency. A scheduler in a CPU keeps track of such dependencies and schedules the consumer instruction for execution when the produced value is available.

The circuit complexity and size of a scheduler grows exponentially with the number of FUs in a processor and the number of instruction dependencies that must be monitored. As the scheduler size increases, wire length and fan-in/fan-out also increase, which extends propagation delays and negatively affects the processor's performance. To reduce these delays in a processor with a large number of FUs, the FUs may be grouped into clusters that each have a separate scheduler. In a processor with multiple groups ("clusters") of FUs, a steering circuit receives groups of instructions for execution and steers the instructions to the schedulers in the respective clusters. In this regard, the steering circuit also keeps track of dependencies between producer instructions and consumer instructions. A goal of the steering circuit is to optimize throughput of the clusters by keeping the instruction loads of the clusters balanced. Steering policies implemented for this purpose may include sending an instruction to a cluster with the lowest utilization and/or using a round robin approach (e.g., N instructions to each cluster). However, if a consumer instruction needs, as an input value, the produced value of a producer instruction and the consumer instruction is steered to a different cluster than the producer instruction, there is a cluster-to-cluster latency incurred while passing the produced value between the clusters. Due to such latency, the cluster executing the consumer instruction may be forced to stall or idle while waiting for the input value, which also negatively affects the processor's performance. Thus, another steering policy of a steering circuit is to steer the consumer instruction to the same cluster as the producer instruction to avoid the cluster-to-cluster latency. Such steering policy may result in an instruction load imbalance among the clusters. An instruction load imbalance may lead to suboptimal execution due to some resources being oversubscribed in one cluster while resources in another cluster are unused.

SUMMARY

Exemplary aspects disclosed herein include opportunistic consumer instruction steering based on producer instruction value prediction in a multi-cluster processor. The processor provides groups of program instructions to a steering circuit that steers the program instructions to a plurality of clusters in the processor for execution. Each of the clusters includes a plurality of instruction execution circuits or pipelines for executing program instructions. The program instructions include producer instructions that generate produced values and consumer instructions that require an input value for execution. An input value provided to a consumer instruction may be a produced value of a producer instruction, making the consumer instruction dependent on the producer instruction. The consumer instruction may be steered to a different cluster than the producer instruction on which it depends to balance cluster loads, but there is a cluster-to-cluster latency when passing the produced value from one cluster to another. The processor also includes a value predictor circuit for generating a predicted value, which is a prediction of the produced value of the producer instruction, before the producer instruction is executed. The steering circuit steers a producer instruction to a first cluster and, in response to receiving the consumer instruction and the predicted value of the producer instruction, provides the predicted value to at least a second cluster and steers the consumer instruction to the second cluster for execution with the predicted value as the input value. In this manner, a consumer instruction can be executed in a different cluster than a producer instruction without a cluster-to-cluster latency penalty, and this allows the instruction loads to be better balanced among the clusters for higher processor throughput.

In this regard, exemplary aspects disclosed herein include a multi-cluster processor, including a plurality of clusters, each cluster including a plurality of instruction execution circuits configured to execute program instructions comprising producer instructions and consumer instructions. The multi-cluster processor includes a value predictor circuit that generates a predicted value of a producer instruction, where the predicted value is a prediction of a value produced by the producer instruction. The multi-cluster processor also includes a steering circuit to receive a producer instruction and a predicted value of a producer instruction and steer the producer instruction to a first cluster for execution. The steering circuit also receives a consumer instruction that depends on a produced value of the producer instruction as an input value. In response to receiving both the predicted value and the consumer instruction, the steering circuit steers the predicted value to a second cluster, and steers the consumer instruction to the second cluster for execution using the predicted value as the input value.

In another exemplary aspect, a method of a steering circuit in a multi-cluster processor comprising a value predictor circuit is disclosed. The method incudes receiving, in the steering circuit, a producer instruction and a predicted value including a prediction of a produced value of the producer instruction. The method includes steering the producer instruction to a first cluster for execution and receiving, in the steering circuit, a consumer instruction that depends on the produced value of the producer instruction as an input value. The method further includes, in response to receiving the predicted value and the consumer instruction, providing the predicted value to a second cluster; and steering the consumer instruction to the second cluster for execution using the predicted value as the input value.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
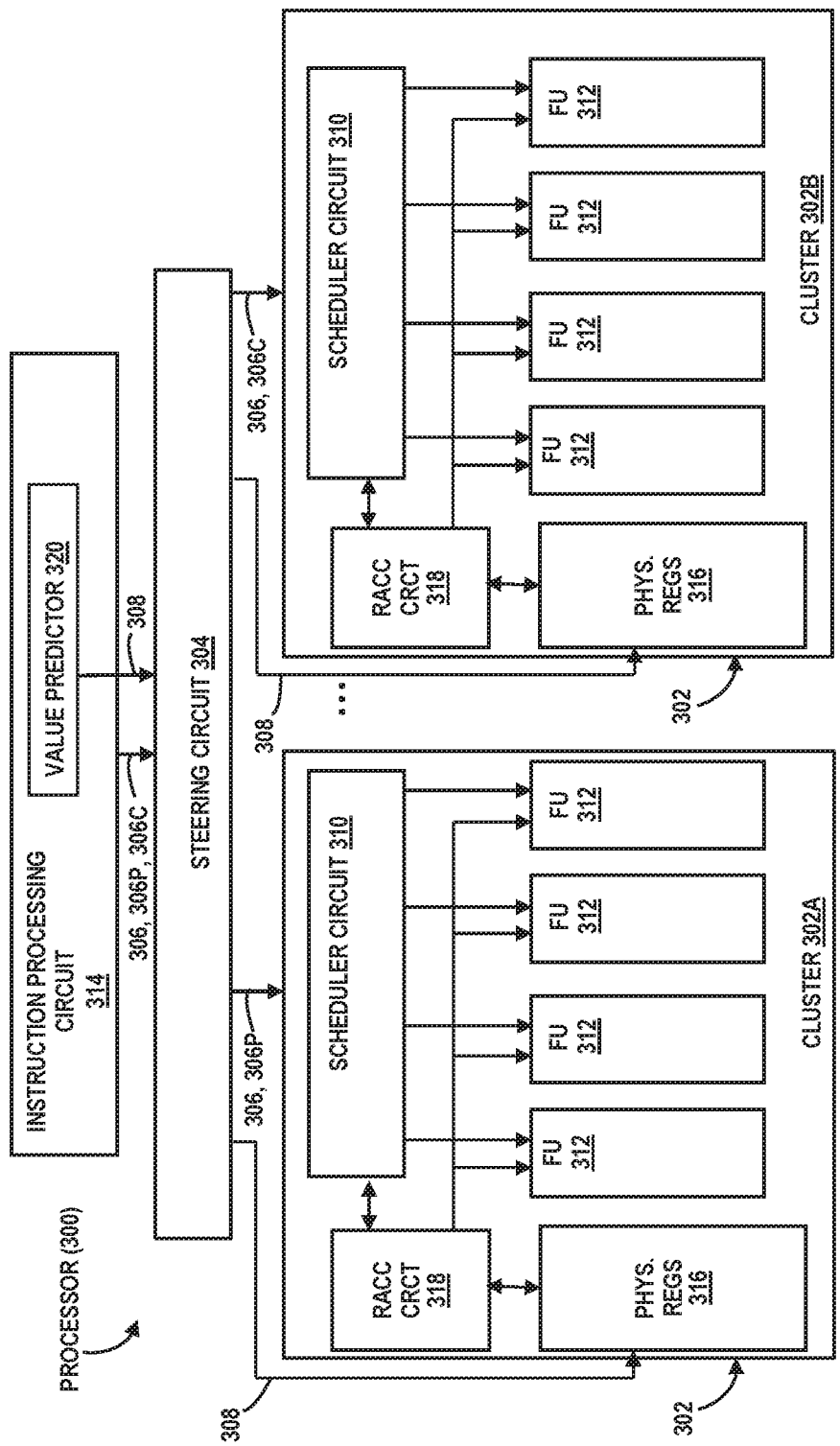
Figure 4:
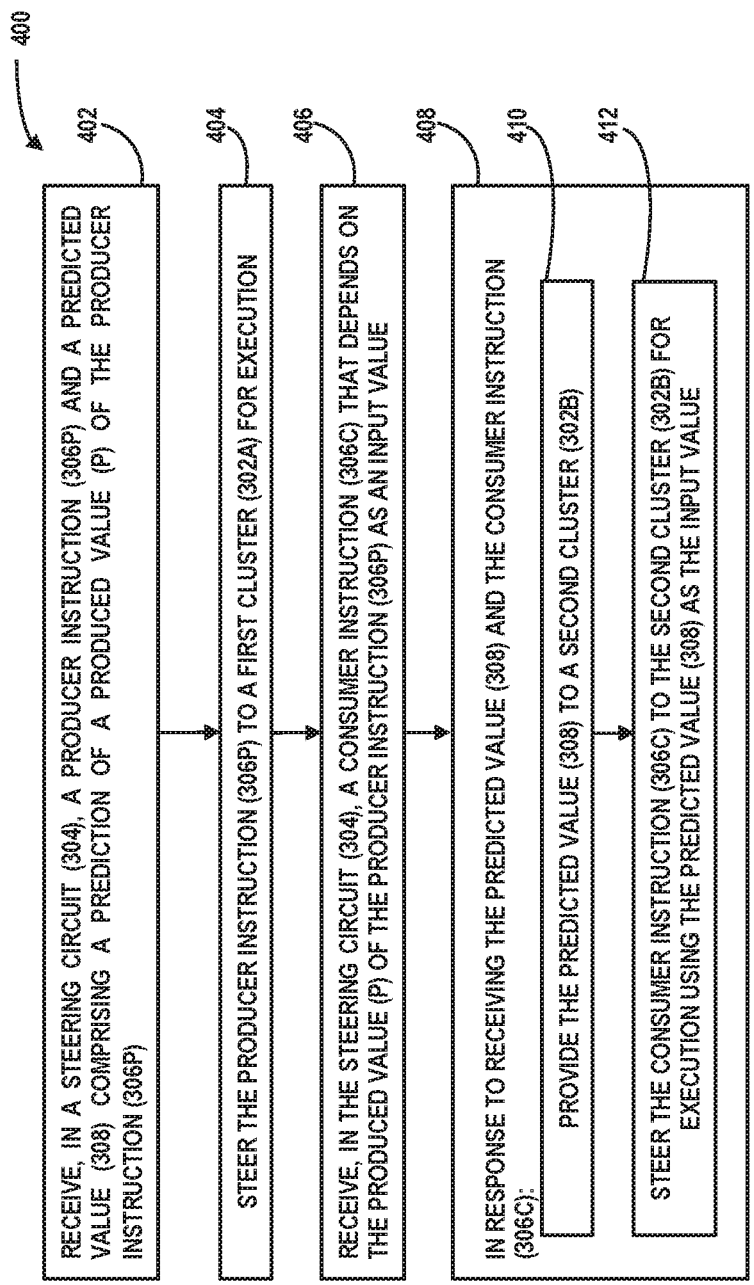
Figure 5B:
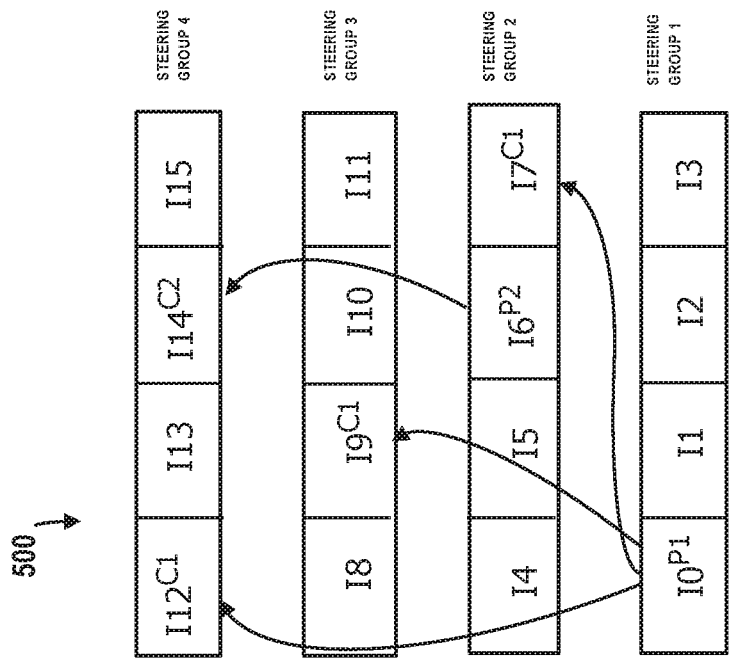
Figure 5A:
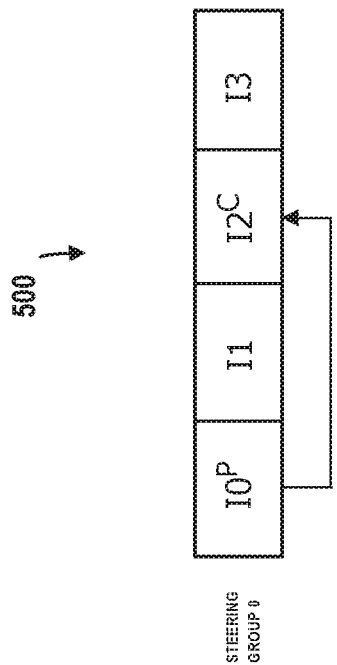
Figure 7:
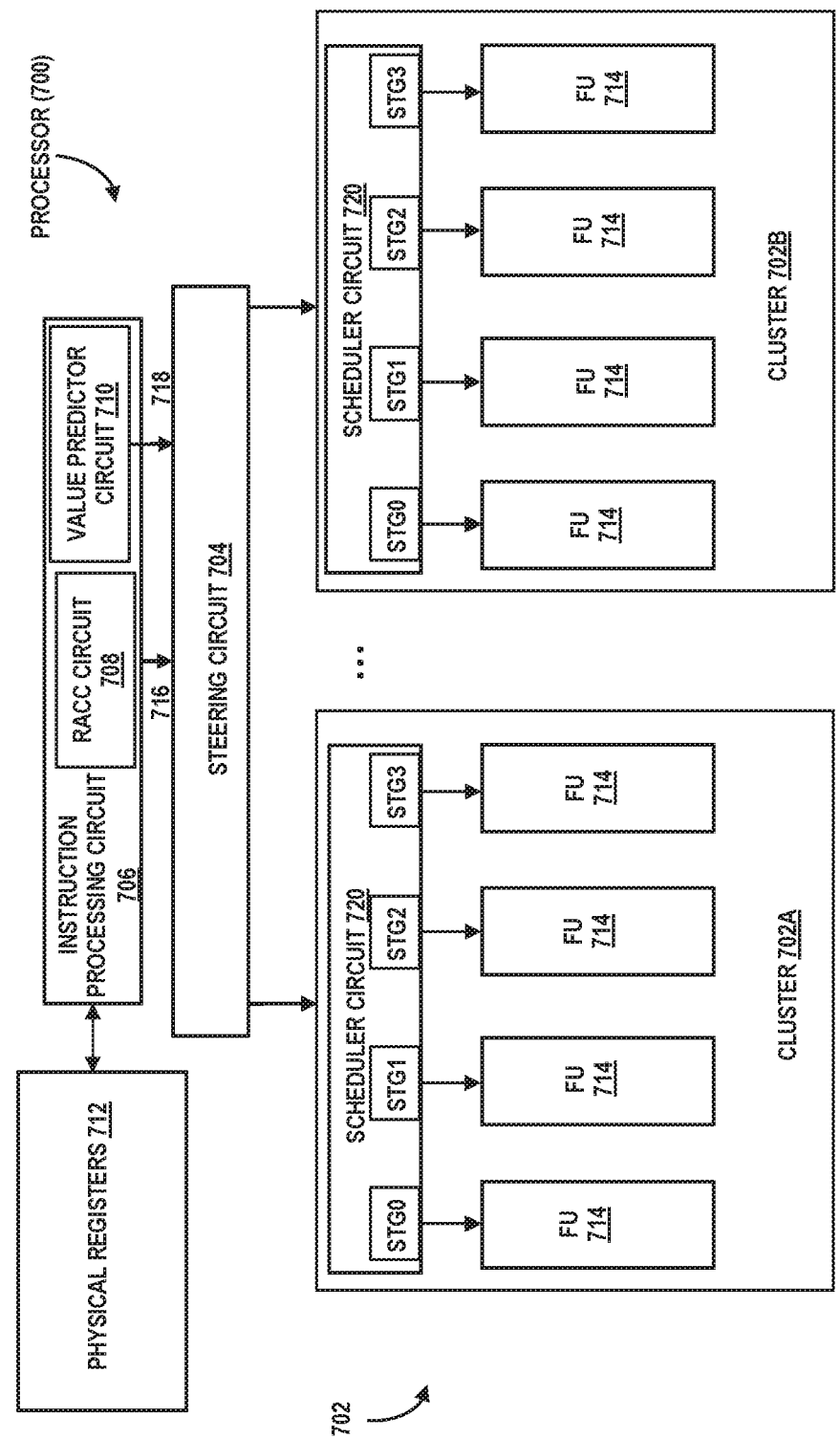
Figure 8:
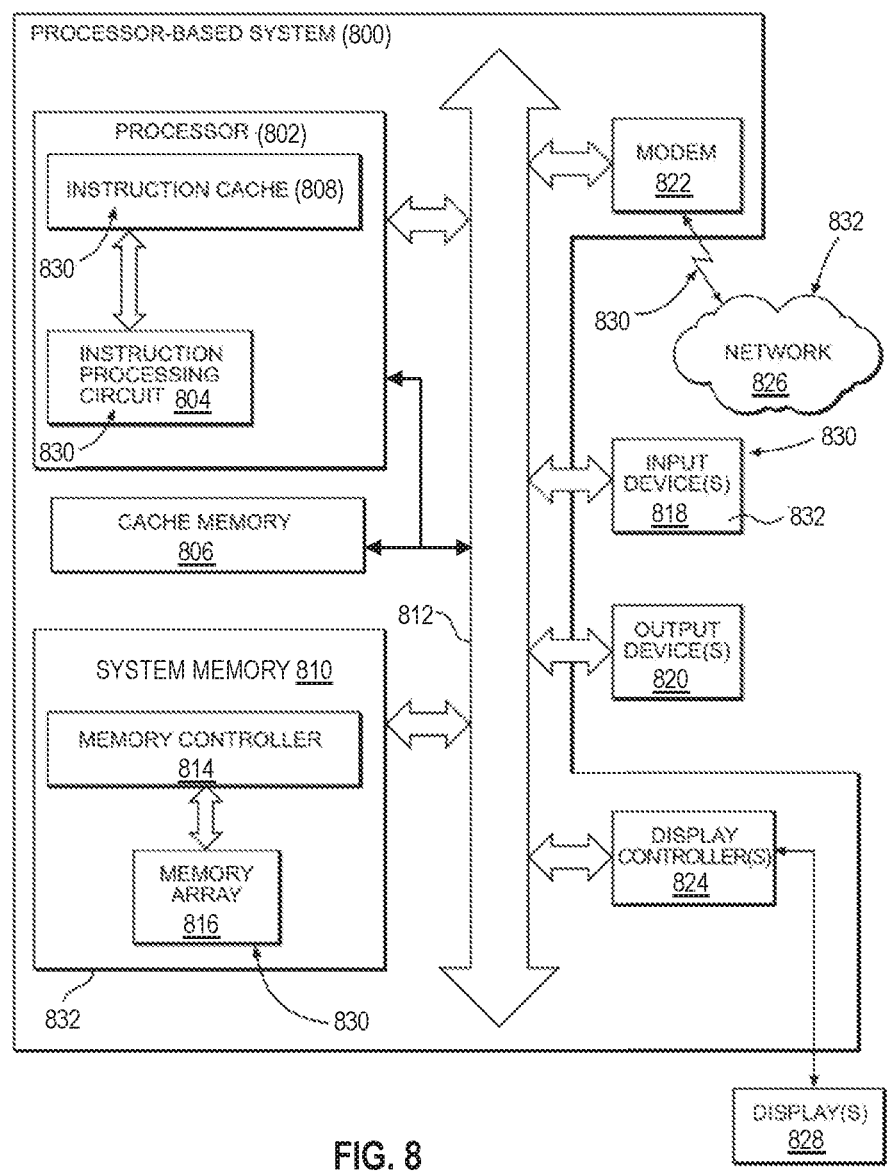

FIG. 3 is a schematic diagram of an exemplary processor in which the back end includes a plurality of clusters configured to execute instructions and a steering circuit configured to steer a producer instruction to a first one of the clusters and, in response to receiving a consumer instruction and a predicted value of the producer instruction, provide the predicted value to at least a second one of the plurality of clusters and opportunistically steer the consumer instruction to the second cluster for execution with the predicted value as the input value;

FIG. 4 is a flowchart illustrating an exemplary process of the steering circuit in the processor in FIG. 3 comprising the plurality of clusters configured to execute producer instructions and consumer instructions and the value predictor circuit configured to generate predicted values, the process including steering a consumer instruction and a predicted value to a cluster for execution;

FIGS. 5A and 5B are illustrations of steering groups including producer instructions and dependent consumer instructions provided to the steering circuit each cycle of a clock in the multi-cluster processor in FIG. 3 for steering to respective clusters for execution;

FIG. 6 is an illustration of a state of an exemplary renaming alias table (RAT) at a moment in the operation of the processor in FIG. 3 in a configuration including four clusters that have clustered physical registers;

FIG. 7 is a schematic diagram of an exemplary processor in a second example in which a plurality of clusters are configured to execute instructions and a steering circuit is configured to steer producer instructions and opportunistically steer consumer instructions, in which the physical registers and access thereto are different from the processor in FIG. 3; and FIG. 8 is a block diagram of an exemplary processor-based system that includes a multi-cluster processor such as the processor in FIG. 3 or 7 with a steering circuit configured to provide a predicted value and steer a consumer instruction to a cluster for execution.

DETAILED DESCRIPTION

Exemplary aspects disclosed herein include opportunistic consumer instruction steering based on producer instruction value prediction in a multi-cluster processor. The processor provides groups of program instructions to a steering circuit that steers the program instructions to a plurality of clusters in the processor for execution. Each of the clusters includes a plurality of instruction execution circuits or pipelines for executing program instructions. The program instructions include producer instructions that generate produced values and consumer instructions that require an input value for execution. An input value provided to a consumer instruction may be a produced value of a producer instruction, making the consumer instruction dependent on the producer instruction. The consumer instruction may be steered to a different cluster than the producer instruction on which it depends to balance cluster loads, but there is a cluster-to-cluster latency when passing the produced value from one cluster to another. The processor also includes a value predictor circuit for generating a predicted value, which is a prediction of the produced value of the producer instruction, before the producer instruction is executed. The steering circuit steers a producer instruction to a first cluster and, in response to receiving the consumer instruction and the predicted value of the producer instruction, provides the predicted value to at least a second cluster and steers the consumer instruction to the second cluster for execution with the predicted value as the input value. In this manner, a consumer instruction can be executed in a different cluster than a producer instruction without a cluster-to-cluster latency penalty, and this allows the instruction loads to be better balanced among the clusters for higher processor throughput.

Figure 1:
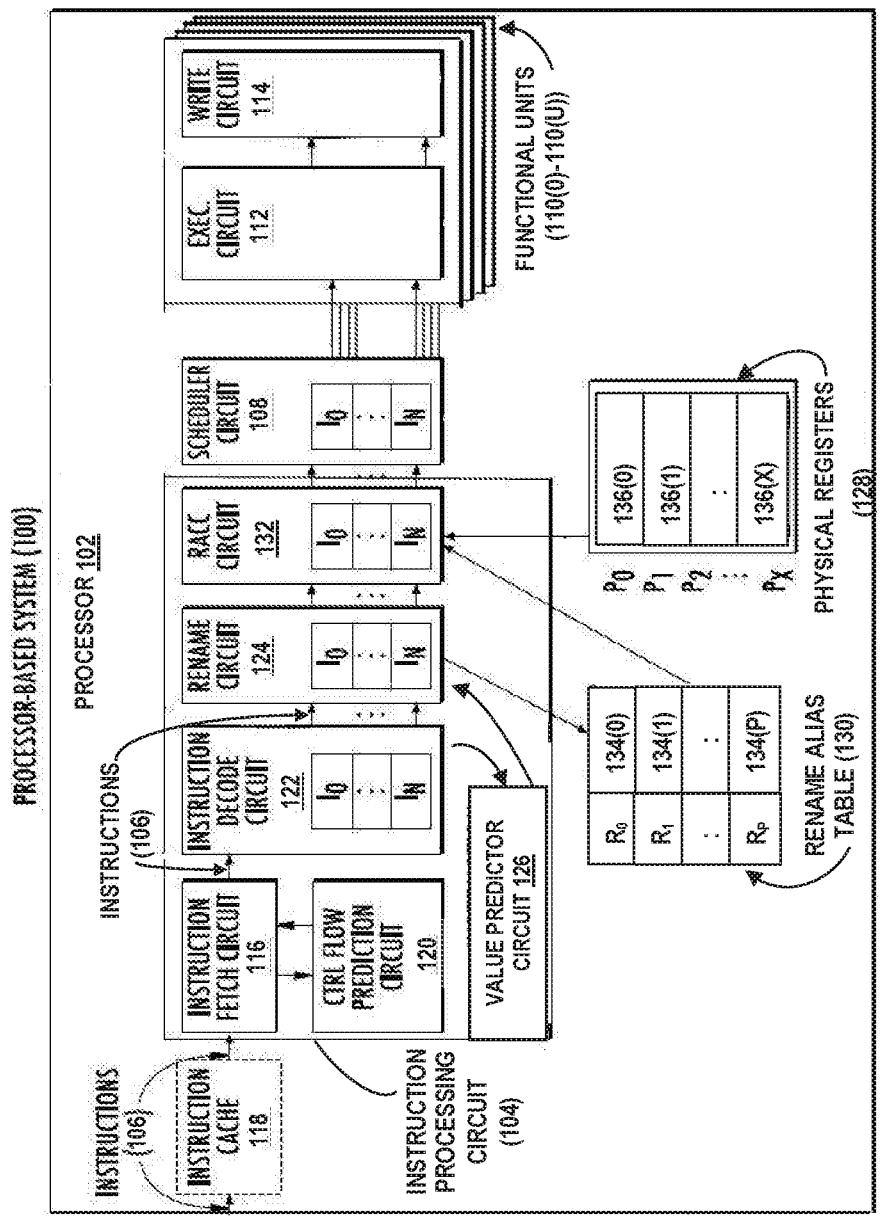
FIG. 1 is a diagram of an exemplary processor-based system that includes a processor with an instruction processing circuit that includes one or more instruction pipelines for processing computer instructions for execution, wherein the instruction processing circuit includes a scheduler circuit configured to schedule issuance of instructions to an execution circuit to be executed.
Figure 2:
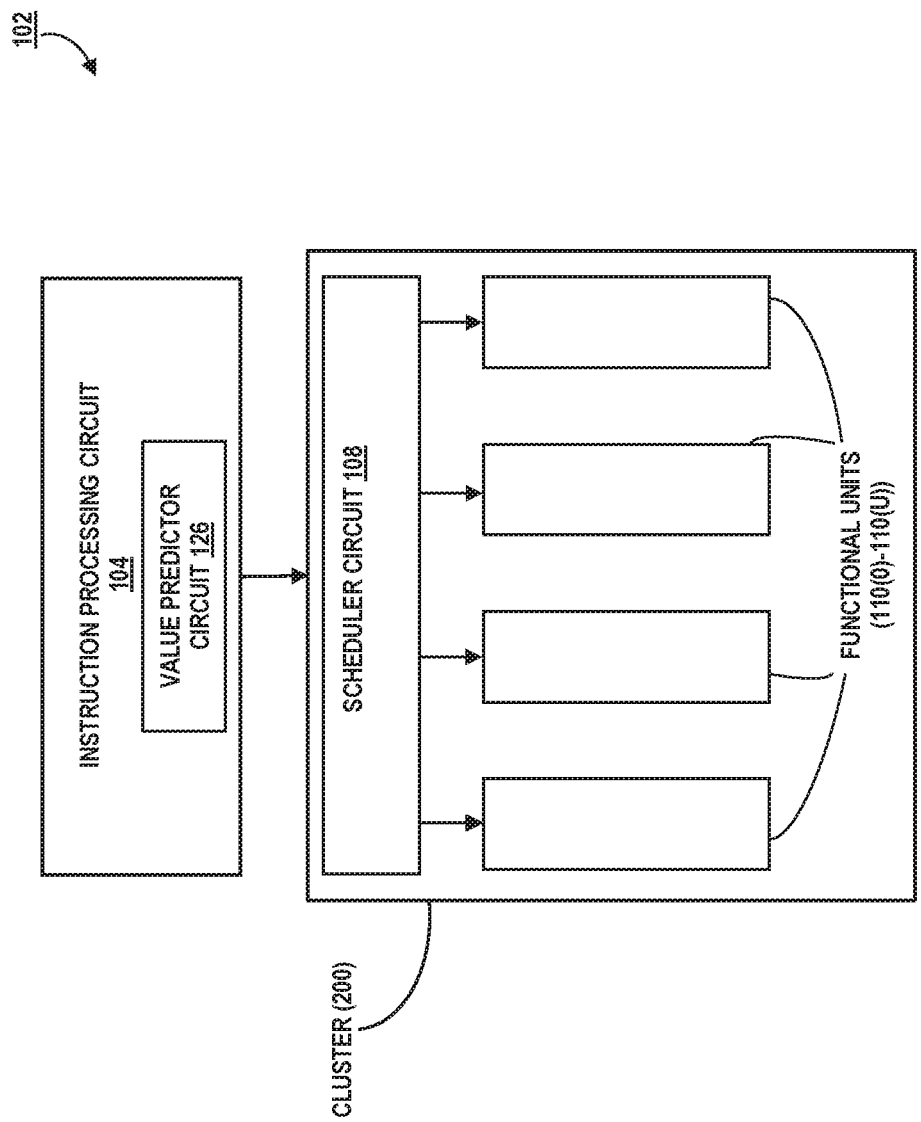
FIG. 2 is a high-level schematic diagram of the processor of FIG. 1 including an instruction processing circuit for front end processing, a scheduler circuit, and a plurality of functional units in a cluster in the back end.

Before discussing an exemplary multi-cluster processor that includes a steering circuit configured to steer a producer instruction to a first cluster and opportunistically steer a consumer instruction to a second cluster in response to receiving the consumer instruction and a predicted value of an input value starting at FIG. 3, a processor-based system that includes a processor that includes a cluster of instruction execution pipelines and a scheduler circuit for scheduling instructions to be executed in the instruction execution pipelines is first discussed with regard to FIGS. 1-2 below.

In this regard, FIG. 1 is a schematic diagram of one example of a processor-based system 100 that includes a processor 102. On the front end, the processor 102 includes an instruction processing circuit 104 that includes one or more instruction pipelines $I_0$-$I_N$ for processing computer instructions 106. The processor 102 also includes a scheduler circuit 108 that receives instructions 106 from the instruction processing circuit 104 and schedules instructions to be executed in a back end of the processor 102 in one of a plurality of functional units 110(0)-110(U) that each include an execution circuit 112 and a write circuit 114. One of the functional units 110(0)-110(U) is referred to herein as a functional unit 110(U). The processor 102 may be an in-order or an out-of-order processor (OoP) as examples. In another example, the front end, or the instruction processing circuit 104, may execute processing in order, and the functional units 110(0)-110(U) of the processor 102 may execute instructions 106 out of order in the back end of the processor 102. The instruction processing circuit 104 includes an instruction fetch circuit 116 that is configured to fetch instructions 106 from an instruction memory by way of an instruction cache 118. The instruction memory may be provided in or as part of a system memory in the processor-based system 100 as an example. The instruction cache 118 may also be provided in the processor 102 to cache the instructions 106 fetched from the instruction memory 114 to reduce timing delay in the instruction fetch circuit 116. The instruction fetch circuit 116 in this example is configured to provide the instructions 106 into the one or more instruction pipelines $I_0$-$I_N$ in the instruction processing circuit 104 to be pre-processed, which includes scheduling in the scheduler circuit 108 before the fetched instructions 106 reach the functional units 110(0)-110(U) to be executed.

The fetched instructions 106 include instructions that use ("consume") output values generated ("produced") by previous instructions and also produce output values that will be consumed by subsequent instructions. An instruction may be referred to as both a producer instruction if it generates a produced value and a consumer instruction if it consumes produced values of producer instructions. In this context, however, the designation of a producer instruction and a consumer instruction identifies a relationship between two instructions.

The instruction pipelines $I_0$-$I_N$ are provided across different processing circuits or stages of the instruction processing circuit 104 to pre-process and process the fetched instructions 106 in a series of steps that can be performed concurrently to increase throughput prior to execution of the fetched instructions 106 by the functional units 110(0)-110(U). A control flow prediction circuit 120 (e.g., a branch prediction circuit) is also provided in the instruction processing circuit 104 in the processor 102 in FIG. 1 to speculate or predict the outcome of a predicate of a fetched conditional control instruction 106, such as a conditional branch instruction, that affects the instruction control flow path. The prediction of the control flow prediction circuit 120 can be used by the instruction fetch circuit 116 to determine the next fetched instructions 106 to fetch based on the predicted target address. The instruction processing circuit 104 also includes an instruction decode circuit 122 configured to decode the fetched instructions 106 fetched by the instruction fetch circuit 116 to determine the instruction type and actions required.

In this example, the decoded instructions 106 are placed in one or more of the instruction pipelines $I_0$-$I_N$ and are next provided to a rename circuit 124 in the instruction processing circuit 104. The rename circuit 124 is configured to determine if any register names in the decoded instructions 106 need to be renamed to break any register dependencies that would prevent parallel or out-of-order processing. The instruction processing circuit 104 includes a value predictor circuit 126 used for dataflow speculation to make predictions of produced values that will be produced by producer instructions. Dataflow speculation generates predicted values to improve performance by allowing a consumer instruction to be executed sooner based on a level of confidence in the predicted value. Value predictions may be employed in clustered and non-clustered processors.

In examples herein, the rename circuit 124 identifies a physical register 128 to be associated with a logical destination register of a producer instruction in a rename alias table 130. When a predicted value of the produced value of the producer instruction is available, an RACC circuit 132 writes the predicted value to the identified physical register 128 associated with the logical destination register. The RACC circuit 132 then allows the predicted value to be obtained from the physical registers 128 by a consumer instruction that can use the predicted value as an input value. Using the predicted value as the input value, rather than waiting for the producer instruction to generate the produced value, the consumer instruction may be executed out of order in one of the functional units 110(0)-110(U) with a high degree of confidence.

The rename circuit 124 is configured to call upon a rename alias table 130 to rename a logical source register operand and/or write a destination register operand of a decoded instruction 106 to available physical registers $P_0$, $P_1$, . . . , $P_X$ in physical registers 128 of a physical register file. The rename alias table 130 contains a plurality of register mapping entries 134(0)-134(P) each mapped to (i.e., associated with) a respective logical register $R_0$-$R_P$ which are architected registers of the processor 102. The register mapping entries 134(0)-134(P) are each configured to store respective mapping information for the corresponding logical registers $R_0$-$R_P$ to a physical register $P_0$-$P_X$ in the physical registers 128. Each physical register $P_0$-$P_X$ is configured to store a data entry 136(0)-136(X) for the source and/or destination register operand of a decoded instruction 106.

FIG. 2 is a high-level schematic diagram of the processor 102 of FIG. 1 including the instruction processing circuit 104 for front end processing, the scheduler circuit 108, and the functional units 110(0)-110(U) in a cluster in the back end. In the example in FIG. 2, the scheduler circuit 108 schedules instructions 106 to the functional units 110(0)-110(U) in a cluster 200 for execution, which may be out-of-order execution, in the back end of the processor 102. The example in FIG. 2 includes four functional units 110(0)-110(U). In this regard, under optimal load balancing and scheduling conditions, the maximum throughput of the processor 102 is limited to U+1=4 instructions per cycle. To increase performance of the processor 102, the number U+1 of the functional units 110(0)-110(U) may be increased. The scheduler circuit 108 is responsible for scheduling instructions 106 to each of the functional units 110(0)-110(U) each cycle making sure all the needs for inputs and conditions necessary prior to execution have been satisfied. In an example, the logic circuitry of the scheduler circuit 108 for managing the scheduling and data handling for all the functional units 110(0)-110(U) may be centralized. In another example, the scheduler circuit 108 may be implemented with individual control logic for each of the functional unit 110(0)-110(U) in a distributed manner. In any configuration, as the number U+1 of functional units 110(0)-110(U) increases, the size (e.g., number of gates, area, wire lengths, etc.) of the scheduler circuit 108 increases superlinearly (e.g., quadratically). In addition to a prohibitive increase in circuit area, the increased wire lengths and increased fan-in and fan-out increases propagation delays in the critical paths as the scheduler circuit 108 becomes larger. Thus, the gains in performance achieved by the increase in the number of functional units 110(0)-110(U) are offset such that the increased delays may require a slower clock rate or increased cycle time.

FIG. 3 is a schematic diagram of an exemplary processor 300 (e.g., a multi-cluster processor 300) in a first example including a plurality of clusters 302 configured to execute instructions and a steering circuit 304 configured to opportunistically steer, in response to receiving a consumer instruction 306C and a predicted value 308, the consumer instruction 306C to a cluster 302 for execution with the predicted value 308 as the input value. The steering circuit 304 improves balancing of instruction loading among the clusters 302 in the processor 300 and avoids a cluster-to-cluster latency conventionally incurred between a cluster 302 executing a producer instruction 306P and a cluster 302 executing a consumer instruction 306C depending on the producer instruction 306P for a produced value P (not shown).

In the example in FIG. 3, only clusters 302A and 302B are shown but any number of other clusters (e.g., 302C, 302D, etc.) may also be included. Each of the clusters 302A and 302B includes a scheduler circuit 310 for scheduling instructions 306 to instruction execution circuits 312. The instruction execution circuits 312 may be the functional units 110(0)-110(U) in FIG. 1 which include execution circuits 112 and write circuits 114. The instruction execution circuits 312 are also referred to herein as functional units 312 or FUs 312. However, the instruction execution circuits 312 are not limited to the functional units 110(0)-110(U) in FIG. 1. The instruction execution circuits 312 or FUs 312 may be any circuit for executing one or more types of instructions in a processor. In examples described herein, each cluster 302 may have the same number and types of functional units 312. Therefore a description of operation of a cluster 302 is applicable to any of the clusters 302A, 302B, etc. However, the exemplary aspects disclosed herein are not limited to processors in which the clusters are the same.

In the example in FIG. 3, the instructions 306 fetched from memory are decoded and their operands are renamed in an instruction processing circuit 314, in the front end of the processor 300. Renaming is performed to remove false dependencies between instructions that may result from having a limited number of architected (logical) registers available for programming purposes to be used by multiple instructions in an out-of-order processor. For example, one instruction adds the values of logical registers A and B and writes the result into logical register C, and a second instruction, located after the first instruction in program order, adds the values of logical registers E and F and writes the result into logical register A. An out-of-order processor ensures that the write to logical register A of the second instruction does not interfere with the read of the older version of logical register A by the first instruction, which could happen if the second instruction executes first. Therefore, instructions may be serialized due to this Write-after-Read dependency (e.g., the instruction that writes to logical register A can happen only after the value in logical register A has been read by a consumer of the previous version). However, such serialization can negatively impact performance. Therefore, register renaming is used to map the logical register A for the second instruction to a different physical register in the processor than the physical register to which the logical register A for the first instruction is mapped. Therefore, the second instruction can execute out-of-order with respect to the first instruction without risking interfering (e.g., overwriting) value in the logical register A needed by the first instruction.

The instruction processing circuit 314 may be the instruction processing circuit 104 in FIG. 1. A separate scheduler circuit 310 is provided for each of the U+1 functional units 312 in a cluster 302 to avoid the problems of a single scheduler circuit 310 for a larger number of functional units 312, as discussed above regarding FIG. 2. In this regard, the processor 300 also includes the steering circuit 304 configured to steer instructions 306 from the instruction processing circuit 314 to the scheduler circuits 310 in respective clusters 302. The steering circuit 304 implements one or more steering policies to achieve the objective of maximizing instruction throughput. For example, the steering circuit 304 may send an instruction 306 to a cluster 302 experiencing a lowest utilization of resources, where utilization may be measured in various ways, such as instruction throughput. In another example, the steering circuit 304 may always choose to send a consumer instruction 306C to a same cluster 302 as the producer instruction 306P on which the consumer instruction 306C depends for an input value. In yet another example, the steering circuit 304 may implement a round-robin approach in which every N instructions 306 are sent to one of the clusters 302 in rotation. Inefficient steering policies may result in, for example, one cluster 302 being fully loaded most of the time while other clusters 302 go unused or only lightly used.

In other examples, the number and/or capabilities of the functional units 312 in each cluster 302 may vary, which will affect the policies used by the steering circuit 304 for distributing instructions 306, but such variations are within the scope of the exemplary aspects disclosed herein.

In the example in FIG. 3, each cluster 302 includes a plurality of physical registers 316 available to the functional units 312 of the cluster 302. The physical registers 316 provided to each cluster 302 may be referred to as clustered physical registers 316, and may logically be considered a slice or portion of a physical register file available to the processor 300 even if the clustered physical registers 316 may be implemented as physically separate registers for faster accessibility to the cluster 302. In a cluster 302 including clustered physical registers 316, an RACC circuit 318, which corresponds in function to the RACC circuit 132 in FIG. 1, accesses an operand in the physical register 316 that is associated with a logical register by a rename alias table (RAT) (not shown here). The operands are obtained from the physical registers 316 and provided to the functional units 312 when instructions 306 are scheduled for execution by the scheduler circuit 310. Since the clustered physical registers 316 are accessed only by the functional units 312 of a particular cluster 302, the access interface of the physical registers 316 is much less complex than in another implementation in which a central monolithic physical register file is accessed by every functional unit in a processor.

The steering circuit 304 in FIG. 3 recognizes that a consumer instruction 306C cannot be executed until a requirement for an input value is satisfied, but this requirement can be satisfied by a predicted value 308. Such recognition allows the steering circuit 304 to opportunistically steer the consumer instruction 306C to a different cluster 302 than a producer instruction 306P to avoid suspending execution of the consumer instruction until after the producer instruction has executed. By providing the predicted value 308 to a cluster 302 to which the consumer instruction 306C is steered, the processor 300 can allow the consumer instruction 306C to execute before or at the same time as a producer instruction 306P and avoids the cluster-to-cluster latency that is normally incurred in passing a produced value P from a first cluster 302 to a second cluster 302. It should be noted that a predicted value 308 may not always be accurately predicted by a value predictor circuit 320. Thus, the value predictor circuit 320 may also generate an indication of a level of confidence in the accuracy of the predicted value 308. In an example, an indication of a high level of confidence may be provided to the steering circuit 304 in association with a predicted value 308 to indicate that the predicted value 308 can be used in place of a produced value P in execution of the consumer instruction 306C with a high level of confidence in the result. In another example, the value predictor circuit 320 will not provide an indication of confidence to the steering circuit 304 but will not provide any predicted value 308 unless the value predictor circuit 320 has an indication of a high level of confidence of the accuracy of the predicted value 308. After the produced value P has been generated by execution of the producer instruction 306P, the produced value P may be compared to the predicted value 308 to determine whether the value predictor circuit 320 correctly predicted the predicted value 308. If the predicted value 308 is the same as the produced value P from the producer instruction 306P, processing continues without delay. If the predicted value 308 differs from the produced value P from the producer instruction 306P, processing of the consumer instruction 306C may be suspended until the consumer instruction 306C can be re-executed with the actual producer value as the input value, and processing can continue.

FIG. 4 is a flowchart illustrating an exemplary process 400 of the steering circuit 304 in the processor 300 of FIG. 3 comprising the plurality of clusters 302 configured to execute producer instructions 306 and consumer instructions 306 and the value predictor circuit 320 configured to generate predicted values 308, the process 400 including steering a consumer instruction 306C and a predicted value 308 to a cluster 302 for execution. The process 400 includes receiving, in the steering circuit 304, a producer instruction 306P and the predicted value 308 comprising a prediction of a produced value P of the producer instruction 306P (block 402) from the instruction processing circuit 314. The process 400 continues with steering the producer instruction 306P to a first cluster 302A for execution (block 404). The process 400 further includes receiving, in the steering circuit 304, a consumer instruction 306C that depends on the produced value P of the producer instruction 306P as an input value (block 406). The process 400 further includes, in response to receiving the predicted value 308 and the consumer instruction 306C (block 408), providing the predicted value 308 to a second cluster 302B (block 410). The process 400 still further includes steering the consumer instruction 306C to the second cluster 302B for execution using the predicted value 308 as the input value (block 412).

With further reference to FIG. 3, a steering group is a group of instructions 306 received in the steering circuit 304 from the instruction processing circuit 314 in a cycle of a clock of the processor 300 for steering to the plurality of clusters 302 (e.g., 302A, 302B, etc.). In the example in FIG. 3, the steering circuit 304 also receives, from the value predictor circuit 320 in the instruction processing circuit 314, the predicted values 308 of producer instructions 306. FIGS. 5A and 5B are illustrations of examples of steering groups 500 including producer instructions 306 and consumer instructions 306 as examples of operation of the steering circuit 304 in the processor 300.

FIG. 5A is an illustration of a steering group 0 of instructions received in a same cycle including a producer instruction $I0^P$ and a consumer instruction $I2^C$ that depends on the instruction $I0^P$ for an input value. Steering group 0 includes instructions $I0^P$, I1, $I2^C$, and I3, which are also instructions 306 in FIG. 3. Since the producer instruction $I0^P$ and the consumer instruction $I2^C$ are in the same steering group 0, they are both provided to the steering circuit 304 of FIG. 3 in a same cycle. With reference to both FIG. 3 and FIG. 5A, the producer instruction $I0^P$ generates a produced value P that is needed by the consumer instruction $I2^C$ as an input value. Thus, consumer instruction $I2^C$ cannot execute until the input value is available. The steering circuit 304 as described in FIG. 3 recognizes that the need for an input value for the consumer instruction $I2^C$ can be satisfied with a high degree of confidence by the predicted value 308. Thus, in response to receiving the predicted value 308 and the consumer instruction $I2^C$, the steering circuit 304 can provide the predicted value 308 to a different cluster 302 than the producer instruction $I0^P$ and steer the consumer instruction $I2^C$ to the different cluster 302 for execution using the predicted value 308 as the input value. In the example in FIG. 5A, in which a consumer instruction 306C is in a same steering cycle as the producer instruction 306P, the predicted value 308 may be passed to a scheduler circuit 310 of a cluster 302 with or in parallel to the consumer instruction 306C, allowing the scheduler circuit 310 to schedule the consumer instruction 306C for execution in one of the functional units 312 immediately (e.g., in the same cycle in which the producer instruction is executed). In this regard, execution of the consumer instruction 306C does not need to be suspended until after the producer instruction 306P is executed and avoids a delay due to a cluster-to-cluster latency incurred when passing the produced value P.

FIG. 5B is an illustration of steering groups 1 through 4 including instructions $I0^{P1}$ through I15 in four consecutive cycles of a clock of a processor during which consumer instructions are received after a producer instruction. Thus, unlike the example in FIG. 5A, the predicted value 308 does not have to be passed with the consumer instruction 306C to a cluster 302. In a first cycle, steering group 1 includes producer instruction $I0^{P1}$, and other instructions I1-I3 that do not depend on producer instruction $I0^{P1}$. There may be one or more consumer instructions 306C that depend on the producer instruction $I0^{P1}$ but the steering circuit 304 has no way of knowing how many of such consumer instructions 306C will be received or when they will be received. In anticipation of consumer instructions 306C that depend on the producer instruction $I0^{P1}$, the steering circuit 304 provides the corresponding predicted value 308 to at least one and up to all of the clusters 302 other than the cluster 302 to which the producer instruction $I0^{P1}$ is steered. In this manner, the steering circuit 304 can select a cluster 302 to which the predicted value 308 was provided as a destination for steering a consumer instruction 306C in a subsequent cycle.

In the example shown, the processor 300 may include multiple clusters (not shown) 302A-302C. Upon receiving the predicted value 308 corresponding to the producer instruction $I0^{P1}$, the steering circuit 304 may steer the producer instruction $I0^{P1}$ to cluster 302A, and provide the predicted value 308 to each of clusters 302B and 302C.

In the second cycle, a producer instruction $I6^{P2}$ and a consumer instruction $I7^{C1}$ which depends on the producer instruction $I0^{P1}$ are received in steering group 2. The steering circuit 304 determines that the predicted value 308 for the producer instruction $I0^{P1}$ is already available to clusters 302B, 302C and steers the consumer instruction $I7^{C1}$ to, for example, cluster 302B. As a result, the consumer instruction $I7^{C1}$ is able to begin execution immediately using the predicted value 308 as an input value. This avoids the need to wait for the producer instruction $I0^{P1}$ to complete execution in cluster 302A, which can take several cycles depending on the instruction type, and avoids the cluster-to-cluster latency that would be incurred if the consumer instruction $I7^{C1}$ is executed in a different cluster than the producer instruction $I0^{P1}$.

Also, in steering group 2, the producer instruction $I6^{P2}$ may be steered to cluster 302A, 302B, or 302C because each cluster 302 is capable of receiving multiple instructions 306 per cycle. In response to receiving the predicted value 308 for the producer instruction $I6^{P2}$, the steering circuit 304 provides the predicted value 308 to at least one, and up to all, of the clusters 302A, 302B, and 302C in anticipation of consumer instructions 306 that depend on producer instruction $I6^{P2}$. Instructions 14 and 15 are not dependent on producer instruction $I0^{P1}$ or producer instruction $I6^{P2}$.

In a third cycle, steering group 3 includes another consumer instruction $I9^{C1}$ that is a consumer instruction 306C dependent on the producer instruction $I0^{P1}$. The steering circuit 304 is able to determine that the predicted value 308 for producer instruction $I0^{P1}$ is available in any of clusters 302A-302C and steers the consumer instruction to one of those clusters 302 for execution using the predicted value 308. Instructions I8, I10, and I11 are not dependent on producer instruction $I0^{P1}$ or producer instruction $I6^{P2}$.

In a fourth cycle, steering group 4 includes another consumer instruction $I12^{C1}$ that is a consumer instruction 306C dependent on the producer instruction $I0^{P1}$ and also includes consumer instruction $I14^{C2}$ that is a consumer instruction 306C dependent on the producer instruction $I6^{P2}$. The steering circuit 304 is able to determine that the predicted value 308 for producer instruction $I0^{P1}$ is available in clusters 302A, 302B, and 302C and steers the consumer instruction $I12^{C1}$ to one of these clusters 302 for execution using the predicted value 308. The steering circuit 304 is able to determine that the predicted value 308 for producer instruction $I6^{P2}$ is available in clusters 302A, 302B, and 302C and steers the consumer instruction $I14^{C2}$ to one of these clusters 302 for execution using the predicted value 308. Instructions I13 and I15 are not dependent on producer instruction $I0^{P1}$ or producer instruction $I6^{P2}$.

Although the steering circuit 304 can determine which clusters 302 have been provided a predicted value 308 and avoid a cluster-to-cluster latency by steering a consumer instruction 306C to one of such clusters 302, the steering circuit 304 may also choose to steer the consumer instruction 306C to a cluster 302 that has not been provided the predicted value 308, recognizing that the cluster-to-cluster latency penalty will be incurred.

As described above, the steering circuit 304 provides predicted values 308 to one or more clusters 302 in response to receiving the predicted value 308 for a producer instruction 306P. To do so, as shown in FIG. 3, the steering circuit 304 has access to write ports in the physical registers 316 for writing the predicted values 308 into each cluster 302, such that the predicted value 308 is available to the receiving cluster(s) 302 in the next cycle. To maintain a record of the clusters 302 to which a particular predicted value 308 has been have been provided selectively or in a broadcast, the steering circuit 304 may employ an exemplary rename alias table (RAT) 600 as illustrated in FIG. 6. Details of the operation of the RAT 600 are explained herein, but the RAT 600 in FIG. 6 is just one example of a RAT that could be used to maintain a record of the predicted values 308 and associate an architected register with one of a plurality of physical registers in each of a plurality of clusters.

The illustration in FIG. 6 is an example of a state of the exemplary RAT 600 at a moment in the operation of the processor 300 in FIG. 3 in a configuration including clusters 302A-302D that have clustered physical registers 316. The RAT 600 in FIG. 6 includes a left-most column in which each row entry indicates an architected or logical register name that may be associated with an instruction operand. An architected register may be further associated with one of the physical registers 316 in each of the clusters 302A-302D, as shown in the columns corresponding to each cluster 302. When the steering circuit 304 provides a predicted value 308 as an operand associated with an architected register to one of the clusters 302, the particular physical register 316 is identified by an entry in the row corresponding to the architected register and in the column corresponding to the cluster 302. In the example shown herein, the physical registers 316 of cluster 302A are identified as physical registers 0-15. Similarly, the physical registers 316 of clusters 302B, 302C, and 302D are identified as physical registers 16-31, 32-47, and 48-63, respectively. In the state shown in FIG. 6, an operand associated with architected register 0 is stored in physical register 12 in cluster 302A, physical register 22 in cluster 302B, and physical register 38 in cluster 302C. An operand associated with architected register 1 is provided to cluster 302A in physical register 1. An operand associated with architected register 2 is provided to cluster 302C in physical register 42, and an operand associated with architected register P is provided to cluster 302D in physical register 49.

In operation, when a producer instruction 306P is received, the RAT 600 may be updated by the steering circuit 304 to associate an architected register corresponding to the input value for the consumer instruction 306C with one of the plurality of physical registers 316 in which the predicted value 308 is stored in the clusters 302A-302D. When a consumer instruction 306C is received in a steering group, the RAT 600 may be accessed to retrieve the association of the architected register to a physical register 316 determine the cluster 302 to which a consumer instruction 306C should be steered. Reclamation of architected registers occurs when instructions are committed, in accordance with conventional RAT operation.

FIG. 7 is a schematic diagram of an exemplary processor 700 in a second example including a plurality of clusters 702 (e.g., 702A and 702B) configured to execute program instructions, a steering circuit 704 and a front end instruction processing circuit 706, but in which the physical registers and access thereto are different from the processor 300 in FIG. 3. In this example, the instruction processing circuit 706 includes an RACC circuit 708 in addition to a value predictor circuit 710, such as in the instruction processing circuit 104 in FIG. 1. In this example, physical registers 712 are implemented as a monolithic central physical register file and all the physical registers 712 that are accessible to the RACC 708 but not to functional units 714. During processing of a producer instruction 716, a predicted value 718 is passed by the steering circuit 704 to scheduler circuits 720 of respective clusters 702 where the consumer instructions 716 dependent on the producer instruction 716 may be steered by the steering circuit 704. The scheduler circuits 720 in FIG. 7 include storage STG0-STG3 for storing operands, which may be actual values or predicted values, until a consumer instruction is ready for execution in any of the functional units 714. The storage STG0-STG3 may also be referred to as a reservation station in some examples.

In the example in FIG. 7, since the RACC circuit 708 accesses the physical registers 712 in the front end, and has access to all of the physical registers available to all the clusters 702, the RAT 600 including a column for each cluster is not needed.

FIG. 8 is a block diagram of an exemplary processor-based system 800 that includes a processor 802 (e.g., a microprocessor) that could be the processor 300 in FIG. 3 that includes the steering circuit 304 or the processor 700 in FIG. 7 that includes the steering circuit 704, as non-limiting examples. The processor-based system 800 may be in an integrated circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 800 includes the processor 802. The processor 802 represents one or more general-purpose processing circuits, such as a microprocessor, central processing unit, or the like. The processor 802 is configured to execute processing logic in instructions for performing the operations and steps discussed herein. In this example, the processor 802 includes an instruction cache 808 for temporary, fast access memory storage of instructions accessible by an instruction processing circuit 804. Fetched or prefetched instructions from a memory, such as from a system memory 810 over a system bus 812, are stored in the instruction cache 808. The instruction processing circuit 804 is configured to process instructions fetched into the instruction cache 808 and process the instructions for execution. Data may be fetched into the processor 802 directly or over a system bus from a cache memory 806.

The processor 802 and the system memory 810 are coupled to the system bus 812 and can intercouple peripheral devices included in the processor-based system 800. As is well known, the processor 802 communicates with these other devices by exchanging address, control, and data information over the system bus 812. For example, the processor 802 can communicate bus transaction requests to a memory controller 814 in the system memory 810 as an example of a slave device. Although not illustrated in FIG. 8, multiple system buses 812 could be provided, wherein each system bus constitutes a different fabric. In this example, the memory controller 814 is configured to provide memory access requests to a memory array 816 in the system memory 810. The memory array 816 is comprised of an array of storage bit cells for storing data. The system memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the system memory 810, one or more input device(s) 818, one or more output device(s) 820, a modem 822, and one or more display controllers 824, as examples. The input device(s) 818 can include any type of input device, including, but not limited to, input keys, switches, voice processors, etc. The output device(s) 820 can include any type of output device, including, but not limited to, audio, video, other visual indicators, etc. The modem 822 can be any device configured to allow exchange of data to and from a network 826. The network 826 can be any type of network, including, but not limited to, a wired or wireless network, a private or public network, a local area network (LAN), a wireless local area network (WLAN), a wide area network (WAN), a BLUETOOTH™ network, and the Internet. The modem 822 can be configured to support any type of communications protocol desired. The processor 802 may also be configured to access the display controller(s) 824 over the system bus 812 to control information sent to one or more displays 828. The display(s) 828 can include any type of display, including, but not limited to, a cathode ray tube (CRT), a liquid crystal display (LCD), a plasma display, etc.

The processor-based system 800 in FIG. 8 may include a set of instructions 830 to be executed by the processor 802 for any application desired according to the instructions. The instructions 830 may be stored in the system memory 810, processor 802, and/or instruction cache 808 as examples of a non-transitory computer-readable medium 832. The instructions 830 may also reside, completely or at least partially, within the system memory 810 and/or within the processor 802 during their execution. The instructions 830 may further be transmitted or received over the network 826 via the modem 822, such that the network 826 includes the computer-readable medium 832.

While the computer-readable medium 832 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multi-cluster processor, comprising:
a plurality of clusters, each cluster comprising a plurality of instruction execution circuits configured to execute program instructions comprising producer instructions and consumer instructions;
a value predictor circuit configured to generate a predicted value of a producer instruction, the predicted value comprising a prediction of a produced value of the producer instruction; and
a steering circuit configured to:
receive the producer instruction;
in response to receiving the producer instruction:
steer the producer instruction to a first cluster among the plurality of clusters for execution;
receive a predicted value comprising a prediction of the produced value of the producer instruction;
determine one or more second cluster among the plurality of clusters to which to make the predicted value available; and
make the predicted value available to the one or more second cluster among the plurality of clusters;
receive a consumer instruction that depends on the produced value of the producer instruction as an input value; and
in response to receiving the consumer instruction:
determine to steer the consumer instruction to the one or more second cluster among the plurality of clusters;
and
steer the consumer instruction to the one or more second cluster of the plurality of clusters for execution using the predicted value as the input value.

2. The multi-cluster processor of claim 1, wherein the steering circuit is further configured to make the predicted value available to the first cluster.

3. The multi-cluster processor of claim 1, wherein the steering circuit is configured to:
receive a second consumer instruction that depends on the produced value as the input value;

determine to steer the second consumer instruction to the one or more second cluster among the plurality of clusters; and steer the second consumer instruction to the one or more second cluster among the plurality of clusters.

4. The multi-cluster processor of claim 1, further configured to receive the consumer instruction in a same cycle as the producer instruction.

5. The multi-cluster processor of claim 4, wherein:
each cluster of the plurality of clusters further comprises a scheduler circuit configured to schedule instructions to the plurality of instruction execution circuits in the cluster; and
the steering circuit configured to make the predicted value available to the one or more second cluster is further configured to store the predicted value in the scheduler circuit of the second cluster.

6. The multi-cluster processor of claim 1, further configured to receive the consumer instruction in a later cycle after a first cycle in which the producer instruction is received.

7. The multi-cluster processor of claim 1, wherein:
each cluster of the plurality of clusters further comprises a plurality of physical registers; and
the steering circuit configured to make the predicted value available to the one or more second cluster is further configured to store the predicted value in one of the plurality of physical registers of the first cluster and in one of the plurality of physical registers of each of the one or more second cluster.

8. The multi-cluster processor of claim 7, wherein the steering circuit is further configured to store the predicted value in one of the plurality of physical registers in a third cluster among the plurality of clusters.

9. The multi-cluster processor of claim 7, further comprising:
a register alias table (RAT) configured to associate an architected register with one of the plurality of physical registers in each of the plurality of clusters,
wherein the steering circuit is further configured to update the RAT to associate an architected register corresponding to the input value of the consumer instruction with the one of the plurality of physical registers in which the predicted value is stored in the first cluster and the one or more second cluster among the plurality of clusters.

10. The multi-cluster processor of claim 9, wherein the steering circuit is further configured to:
access the RAT to identify clusters among the plurality of clusters in which the predicted value is stored in the physical register associated with the architected register corresponding to the input value; and
determine that the one or more second cluster is among the identified clusters.

11. A method of a steering circuit in a multi-cluster processor comprising a value predictor circuit, the method comprising:
receiving, in the steering circuit, a producer instruction;
in response to receiving the producer instruction:
steering the producer instruction to a first cluster among a plurality of clusters for execution;
receiving a predicted value comprising a prediction of the produced value of the producer instruction;
determining one or more second clusters among the plurality of clusters to which to make the predicted value available;
making the predicted value available to the determined one or more second cluster among the plurality of clusters;
receiving, in the steering circuit, a consumer instruction that depends on the produced value of the producer instruction as an input value; and
in response to receiving the consumer instruction:
determining to steer the consumer instruction to the one or more second cluster among the plurality of clusters; and
steering the consumer instruction to the one or more second cluster of the plurality of clusters for execution using the predicted value as the input value.

12. The method of claim 11, further comprising making the predicted value available to the first cluster.

13. The method of claim 11, further comprising:
receiving a second consumer instruction that depends on the produced value as the input value;
determining to steer the second consumer instruction to the one or more second clusters among the plurality of clusters; and
steering the second consumer instruction to the one more second cluster among the plurality of clusters.

14. The method of claim 11, further comprising receiving the consumer instruction in a same cycle as the producer instruction.

15. The method of claim 14, wherein:
each cluster of the plurality of clusters comprises a scheduler circuit configured to schedule instructions to the cluster; and
making the predicted value available to the second cluster further comprises storing the predicted value in the scheduler circuit of the second cluster.

16. The method of claim 11, further comprising receiving the consumer instruction in a later cycle after a first cycle in which the producer instruction is received.

17. The method of claim 16, wherein:
each cluster of the plurality of clusters further comprises a plurality of physical registers; and
making the predicted value available to the second cluster further comprises storing the predicted value in one of the plurality of physical registers of the first cluster and in one of the physical registers of each of the one or more second cluster.

18. The method of claim 17, further comprising storing the predicted value in one of the plurality of physical registers in a third cluster among the plurality of clusters.

19. The method of claim 17, further comprising:
updating a register alias table (RAT) to associate an architected register corresponding to the input value of the consumer instruction with the one of the plurality of physical registers in which the predicted value is stored in the first cluster and in the one or more second cluster among the plurality of clusters.

20. The method of claim 19, further comprising:
accessing the RAT to identify clusters among the plurality of clusters in which the predicted value is stored in the physical register associated with the architected register corresponding to the input value; and
determining that the one or more second cluster is among the identified clusters.

21. The multi-cluster processor of claim 1, further comprising a central physical register file comprising a plurality of physical registers, wherein:
each cluster of the plurality of clusters comprises access to the central physical register file; and the steering circuit configured to make the predicted value available to the one or more second cluster is further configured to store the predicted value in the central physical register file.

22. The method of claim 11, wherein:

each cluster of the plurality of clusters comprises access to a central physical register file comprising a plurality of physical registers; and making the predicted value available to the one or more second cluster among the plurality of clusters further comprises storing the predicted value in the central physical register file.

* * * * *